O. HUKILL.
Animal-Traps.

No. 150,860.

Patented May 12, 1874.

WITNESSES.
Franck L. Outand
C. L. Evert

INVENTOR
Orlando Hukill
Alexander Mason

By

Attorneys.

UNITED STATES PATENT OFFICE.

ORLANDO HUKILL, OF FARMER CITY, ILLINOIS.

IMPROVEMENT IN ANIMAL-TRAPS.

Specification forming part of Letters Patent No. 150,860, dated May 12, 1874; application filed January 23, 1874.

*To all whom it may concern:*

Be it known that I, ORLANDO HUKILL, of Farmer City, in the county of De Witt and in the State of Illinois, have invented certain new and useful Improvements in Animal-Traps; and do hereby declare that the following is a full, clear, and exact description thereof, reference being had to the accompanying drawings, and to the letters of reference marked thereon, making a part of this specification.

The nature of my invention consists in the construction and arrangement of an animal-trap, as will be hereinafter more fully set forth.

In order to enable others skilled in the art to which my invention appertains to make and use the same, I will now proceed to describe its construction and operation, referring to the annexed drawing, in which—

Figure 1:
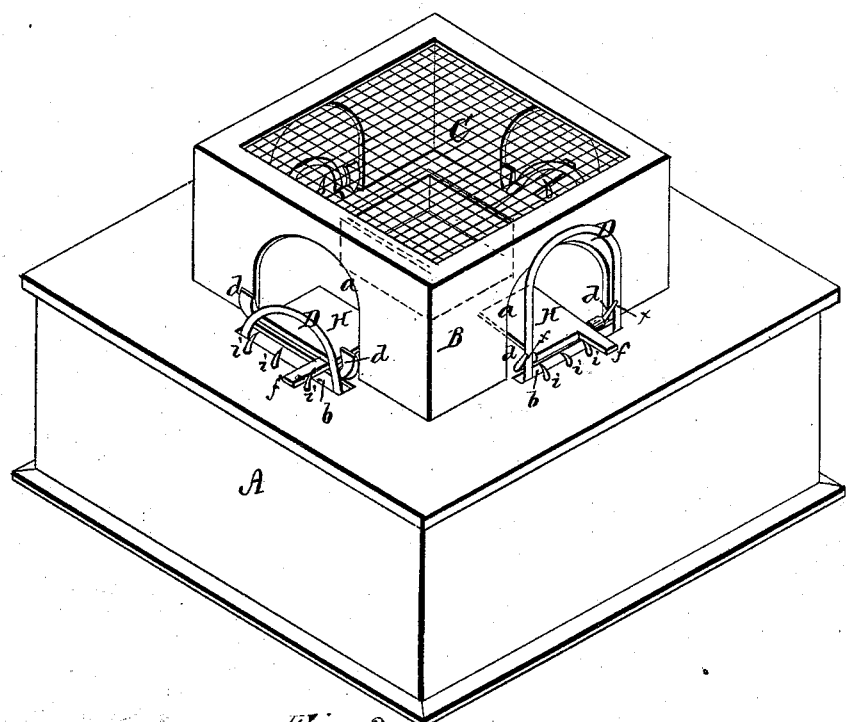
Figure 2:
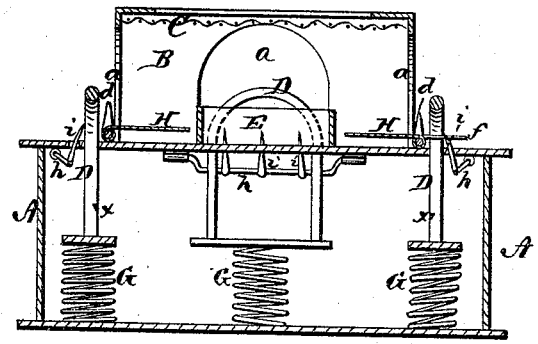

Figure 1 is a perspective view, and Fig. 2 a longitudinal section, of my invention.

A represents a box of any suitable dimensions, forming the base of my trap. On top of the box A is formed or attached another smaller box, B, the top C of which is made of wire, as shown. In the center of the box B, on top of the box A, is attached a bait-cup, E, to hold whatever bait is desired to be used. In each side of the box A is made an aperture, a, of suitable size for such animals as it is intended to catch in the trap. At the bottom of each aperture a slot, b, is made in the top of the base A extending the entire width of said aperture, and through this slot is passed a wire frame, D, the upper part of which corresponds in size and form with the aperture a. The lower end of the frame D is, by a strong spiral spring, G, connected with the bottom of the base A. In the aperture a, on top of the base, and immediately on the inner side of the slot b, is arranged a treadle, H, which extends into the box B, and has upon its shaft two projecting arms, d d, extending upward, and one arm, f, extending outward on a line with the treadle.

When the frame D is raised to correspond with the aperture a, the arm f is depressed, which forces the arms d d into notches x x on the frame and holds it up. As the animal attempts to reach the bait in the bait-box E it must pass through the frame D which surrounds the opening a, and in so doing it steps on the treadle H, thereby releasing the arms d d from the notches x x, causing the spring G to throw the frame suddenly and forcibly downward, catching the animal around the body and holding it against a series of curved teeth, i i. These teeth pass through the top of the base A, and are attached within said base to a crank-shaft, h, so arranged as to allow the teeth to give slightly when the animal tramps on them, their points being bent inward, as shown.

When the trap is sprung, as above described, and the animal caught by the frame D, it will naturally attempt to draw backward, which will fasten it more firmly on the teeth i i.

Having thus fully described my invention, what I claim as new, and desire to secure by Letters Patent, is—

1. The frame D and spring G, in combination with the treadle H and its arms d d and f f, all constructed substantially as and for the purposes herein set forth.

2. The combination of the frame D, spring G, treadle H, with arms d d and f, and the yielding curved pointed teeth i i, all constructed substantially as and for the purposes herein set forth.

3. The combination of the base A, box B, with wire top C, and apertures a, frames D, springs G, treadles H, with arms d f and the teeth i, all constructed substantially as and for the purposes herein set forth.

In testimony that I claim the foregoing I have hereunto set my hand this 8th day of January, 1874.

ORLANDO HUKILL.

Witnesses:
C. L. EVERT,
RICHARD A. LEMON.